United States Patent
Srinivasan et al.

(10) Patent No.: US 10,613,867 B1
(45) Date of Patent: Apr. 7, 2020

(54) SUPPRESSING PIPELINE REDIRECTION INDICATIONS

(71) Applicant: Apple Inc., Cupertino, CA (US)

(72) Inventors: Sendil Srinivasan, Austin, TX (US); Brett S. Feero, Austin, TX (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 15/654,680

(22) Filed: Jul. 19, 2017

(51) Int. Cl.
*G06F 9/38* (2018.01)

(52) U.S. Cl.
CPC .......... *G06F 9/3806* (2013.01); *G06F 9/3848* (2013.01)

(58) Field of Classification Search
CPC .... G06F 9/3806; G06F 9/3848; G06F 8/4451; G06F 9/3844
USPC ........................................................ 712/240
See application file for complete search history.

(56) References Cited

U.S. PATENT DOCUMENTS

| | | | | |
|---|---|---|---|---|
| 5,353,421 A * | 10/1994 | Emma | ................... | G06F 9/3806 712/240 |
| 5,584,001 A * | 12/1996 | Hoyt | ..................... | G06F 9/3806 712/238 |
| 5,864,697 A * | 1/1999 | Shiell | .................... | G06F 9/3848 712/240 |
| 6,003,128 A * | 12/1999 | Tran | ...................... | G06F 9/3844 712/23 |
| 7,962,724 B1 * | 6/2011 | Ali | ......................... | G06F 9/3802 712/207 |
| 8,312,255 B2 | 11/2012 | Sendag | | |
| 8,959,320 B2 | 2/2015 | Beaumont-Smith et al. | | |
| 2001/0047467 A1 * | 11/2001 | Yeh | ........................ | G06F 9/3806 712/228 |
| 2002/0083310 A1 * | 6/2002 | Morris | .................... | G06F 9/325 712/233 |
| 2005/0125646 A1 * | 6/2005 | Yokoi | ................... | G06F 9/3848 712/239 |
| 2006/0190710 A1 | 8/2006 | Rychlik | | |
| 2007/0101111 A1 * | 5/2007 | Svendsen | .............. | G06F 9/3844 712/239 |
| 2009/0210663 A1 * | 8/2009 | Sartorius | ............... | G06F 9/3844 712/207 |
| 2012/0124344 A1 * | 5/2012 | Jarvis | .................... | G06F 9/3806 712/230 |

(Continued)

OTHER PUBLICATIONS

Diefendorff, K. PC Processor Microarchitecture. Microprocessor Report [online], Jul. 1999 [retrieved Dec. 12, 2018]. Retrieved from the Internet:<URL: http://csit-sun.pub.ro/resources/cn/CompArch_6004/microarchitecture.pdf>.*

(Continued)

*Primary Examiner* — Aimee Li
*Assistant Examiner* — Shawn Doman
(74) *Attorney, Agent, or Firm* — Kowert, Hood, Munyon, Rankin & Goetzel, P.C.

(57) ABSTRACT

In various embodiments, a branch prediction redirection system may include a first branch prediction circuit configured to predict a first target of a branch instruction and a second branch prediction circuit configured to predict a second target of the branch instruction. A redirection circuit may send a pipeline redirection indication in response to the first target differing from the second target. A suppression circuit may prevent the pipeline redirection indication from being sent in response to identifying that data corresponding to the branch instruction indicates a potential multi-hit.

16 Claims, 4 Drawing Sheets

(56) References Cited

U.S. PATENT DOCUMENTS

| | | |
|---|---|---|
| 2012/0185714 A1 | 7/2012 | Chung et al. |
| 2013/0125104 A1* | 5/2013 | Valluri .................... G06F 8/452 |
| | | 717/160 |
| 2013/0151823 A1* | 6/2013 | Beaumont-Smith ......................... |
| | | G06F 9/3848 |
| | | 712/240 |
| 2014/0075156 A1* | 3/2014 | Blasco-Allue ........ G06F 9/3802 |
| | | 712/205 |

OTHER PUBLICATIONS

Patt, Yale et al. One Billion Transistors, One Uniprocessor, One Chip. Computer, vol. 30, Issue 9, Sep. 1997 [online], [retrieved Dec. 12, 2018]. Retrieved from the Internet: <URL: https://ieeexplore.ieee.org/stamp/stamp.jsp?tp=&arnumber=612249&tag=1>.*

* cited by examiner

SUPPRESSING PIPELINE REDIRECTION INDICATIONS

BACKGROUND

Technical Field

This disclosure relates generally to a branch prediction redirection system.

Description of the Related Art

One key factor affecting the performance of processors is the management of branch instructions (or more briefly, "branches"). A variety of branch prediction circuits may be used to predict the direction (taken or not taken), the target address, etc. for branches, to allow the processor to fetch ahead of the branches. If the predictions are correct, subsequent instructions to be executed after each branch may already be preloaded into the processor's pipeline, which may enhance performance (e.g., execution time), as compared to fetching the instructions after executing each branch. Further, the subsequent instructions may be speculatively executed and thus may be ready to retire/commit results when the branch is resolved (if the prediction is correct), which may further enhance performance.

While successful branch predictions may increase performance, branch mispredictions may incur costs in both performance and power. Instructions that are subsequent to the branch in the speculative program order (sometimes referred to as younger instructions) may be flushed, any speculative state corresponding to the subsequent instructions may be discarded, and any speculative state corresponding to the most recent instructions that were not flushed may be restored or recreated.

SUMMARY

In various embodiments, a branch prediction redirection system is disclosed where a first-level branch prediction circuit predicts a first target of a branch instruction and a second-level branch prediction circuit predicts a second target of the branch instruction. In some cases, the second target may differ from the first target. In such cases, a redirection circuit may send a pipeline redirection indication. However, in some circumstances, a suppression circuit may prevent the pipeline redirection indication from being sent. As a result, in some cases, power associated with updating the first-level branch prediction circuit may be saved. Additionally, in some cases, a potential multi-hit at the first-level branch prediction circuit may be prevented.

Figure 1:
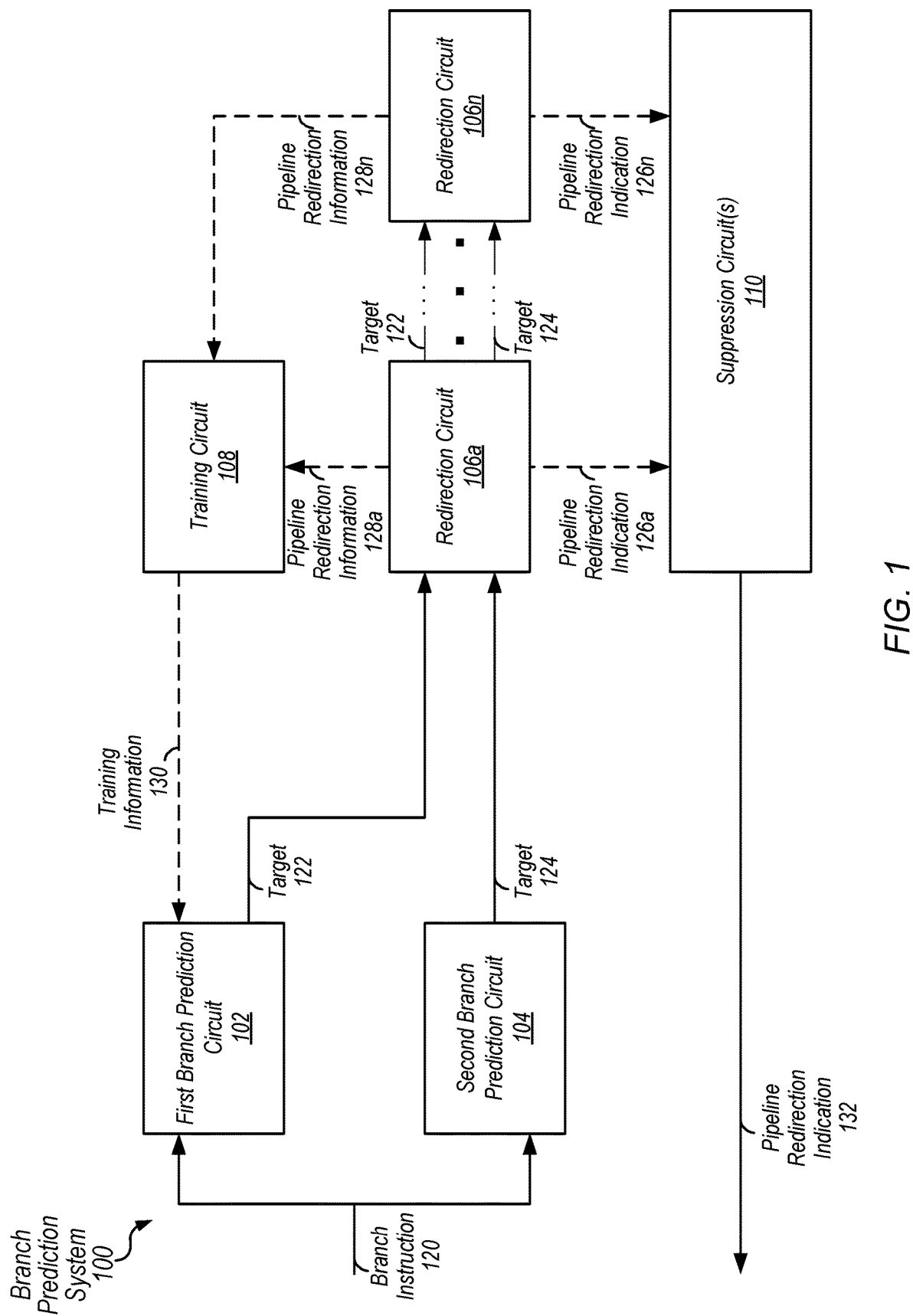
FIG. 1 is a block diagram illustrating one embodiment of an exemplary branch prediction system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processing circuit that includes six branch prediction circuits, the terms "first branch prediction circuit" and "second branch prediction circuit" can be used to refer to any two of the six branch prediction circuits, and not, for example, just logical branch prediction circuits 0 and 1.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A pipeline is disclosed where a first branch prediction circuit predicts a first target of a branch instruction and a second branch prediction circuit predicts a second target of the branch instruction. In some cases, the second target may differ from the first target. In such cases, a redirection circuit may send a pipeline redirection indication (e.g., to an instruction fetch circuit). Additionally, a training circuit may provide training information to the first branch prediction circuit. The training information may be used to teach the first branch prediction circuit more information regarding the branch instruction (retraining the first branch prediction circuit), potentially changing how the first branch prediction circuit predicts an outcome of the branch instruction if it is subsequently executed again.

However, in some embodiments, it may take several (e.g., five) clock cycles after the difference between the second target and the first target is detected before the first branch prediction circuit can be retrained. In some cases, in that time, if the pipeline is redirected in response to the pipeline redirection indication, the branch instruction may be executed again before the first branch prediction circuit is retrained. For example, if the pipeline is executing a loop of two instructions, the first branch prediction circuit may be asked to predict a target of the branch instruction again before the first branch prediction circuit is retrained. Further, because the first branch prediction circuit was asked to predict the target of the branch instruction again, in some cases, the first branch prediction circuit may mispredict the result of the branch instruction multiple times. As a result, the training circuit may attempt to retrain a stale value at the first branch prediction circuit.

One way to make the retrained information available at the first branch prediction circuit more quickly is to create a bypass circuit that stores the training information prior to the first branch prediction circuit being retrained. Branch instructions may be sent to the bypass circuit and the first branch prediction circuit in parallel, and a result from the bypass circuit may be used if a hit is registered. However, adding a bypass circuit may involve adding additional circuitry that may consume an undesirable amount of energy. Further, adding a bypass circuit may add additional circuitry to the output of the first branch prediction circuit, which may add an additional delay to receiving a result from the first branch prediction circuit.

Another way to prevent some cases of retraining stale values at the first branch prediction circuit is to delay the pipe redirection. As a result, execution of additional instructions after the branch may be delayed during at least some of the time while the first branch prediction circuit to be retrained. For example, a branch prediction redirection system may prevent a pipeline redirection indication system from being sent by a redirection circuit (e.g., in response to detecting a loop or an unconditional direct branch instruction). Instead, the pipeline redirection indication may be sent by a different redirection circuit (e.g., in a different part of the pipeline). Depending on an amount of time the redirection is delayed, fewer or no bypass circuits may be used.

As used herein, an "unconditional direct branch instruction" refers to a branch instruction that is always taken and that has a target address determined based on a current program counter value. For example an always taken branch instruction having a target of the value of the program counter minus twelve would be an "unconditional direct branch instruction."

In some embodiments, preventing retraining of stale prediction information at the first branch prediction circuit may prevent a potential multi-hit from occurring at the first branch prediction circuit. As used herein, a "potential multi-hit" refers to a set of conditions that could result in multiple entries of a set associative branch prediction circuit indicating information about a single instruction. In some embodiments, the first branch prediction circuit may store branch prediction information in a set associative storage element. As a result, in some cases, different entries of the first branch prediction circuit may be selected to store branch prediction information for different iterations of the same branch instruction. Such an arrangement may result in inconsistent operation and may cause various errors such as an obsolete target being fetched in response to the branch instruction being executed again. Accordingly, as discussed herein, data indicating that the branch prediction circuit could be retrained multiple times with the same information would indicate a "potential multi-hit."

Turning now to FIG. 1, a simplified block diagram illustrating one embodiment of a branch prediction system 100 is shown. In the illustrated embodiment, branch prediction system 100 includes first branch prediction circuit 102, second branch prediction circuit 104, redirection circuits 106a-n, training circuit 108, and suppression circuit(s) 110. In some embodiments, branch prediction system 100 is part of a processor pipeline. In various embodiments, other circuits may be included (e.g., other circuits that make up the processor pipeline), but, for clarity, such circuits are not shown. In some embodiments, various circuits of branch prediction system 100 may be combined. For example, at least one of redirection circuits 106a-n may be combined with training circuit 108, suppression circuit(s) 110, or both. Similarly, training circuit 108 may be combined with suppression circuit(s) 110.

First branch prediction circuit 102 may, based on stored branch prediction information, predict target 122 of received branch instruction 120. Target 122 may be used to identify a next instruction to be executed by the processor pipeline. The stored branch prediction information may include, for example, an indication of a target if the branch is taken, an indication of a number of instructions after the target of the branch instruction to be fetched (e.g., a number of instructions after the target before another branch instruction occurs). In various embodiments, first branch prediction circuit may include a branch prediction storage element that stores branch prediction information for various branch instructions. The branch prediction storage element may be set associative, fully associative, or direct mapped. In some embodiments, the branch prediction storage element may be indexed based on tags, which may be generated by hashing one or more of an address or a portion of an address of an instruction, branch history information (e.g., pattern history indicating whether previous branches were taken or addresses of previous branches), or both. Hits may be identified by comparing the tags to values associated with the entries. Accordingly, in some embodiments, the branch prediction storage element may have several entries that are configured to store data for a single address and its aliases.

Similar to first branch prediction circuit 102, second branch prediction circuit 104 may, based on stored branch prediction information, predict target 124 of branch instruction 120. In some embodiments, first branch prediction circuit 102 and second branch prediction circuit 104 may be part of a hierarchy. For example, first branch prediction circuit 102 may be a first-level branch prediction circuit and second branch prediction circuit 104 may be a second-level branch prediction circuit. Accordingly, in some embodiments, second branch prediction circuit 104 may store more branch prediction information than first branch prediction circuit 102. Further, in various embodiments, second branch prediction circuit may take more time to identify target 124. Thus, in some cases, target 122 and target 124 may be output during different cycles. In many cases, target 122 and target 124 may indicate the same result. However, in some cases, target 122 may differ from target 124.

In some embodiments, prior to outputting target 124, second branch prediction circuit 104 may output information associated with target 124 that may be used to determine that target 124 differs from target 122. In some embodiments, target 124 may identify a different branch target. In other embodiments, target 124 may indicate that second branch prediction circuit 104 has identified a different outcome of the branch instruction from first branch prediction circuit 102 but has not yet identified the different branch target. For example, second branch prediction circuit may generate, for a branch instruction, a direction prediction indication and a target prediction indication. However, the direction prediction indication may be sent to redirection circuit 106a prior to the target prediction indication. In the illustrated embodiment, various versions of targets 122 and 124 are only sent to redirection circuits 106a-n. However, in other embodiments, targets 122 and 124 may be sent to suppression circuit(s) 110, training circuit 108, or both. In some embodiments, targets 122 and 124 may be sent via various intervening circuits (not shown).

Redirection circuits 106a-n may redirect the processor pipeline based on target 124 indicating a difference from target 122. In some embodiments, in response to not redirecting the pipeline, redirection circuits 106a-n may send indications of targets 122 and 124 to others of redirection circuits 106a-n. For example, in response to target 124 differing from target 122, redirection circuit 106a may send pipeline redirection indication 126a to suppression circuit(s) 110 and may send pipeline redirection information 128a to training circuit 108. In some embodiments, pipeline redirection information 128a may be the same as pipeline redirection indication 126a. In response to not redirecting the pipeline (e.g., because target 122 and 124 are the same or because suppression circuit(s) prevented pipeline redirection indication 132 from being sent), redirection circuit 106a may send indications of targets 122 and 124 to redirection circuit 106b (e.g., a next redirection circuit). In various embodiments, redirection circuits 106a-n may be in different stages of the processor pipeline and, in some cases, may receive different indications of target 122 and target 124. For example, second branch prediction circuit 104 may send a partial indication (e.g., fewer than all bits of target 124 or an address of target 124 but not all information used to generate training information 130) of target 124 to redirection circuit 106a (e.g., because target 124 has not yet been fully determined by a corresponding clock cycle). However, in the example, second branch prediction circuit may fully indicate target 124 to redirection circuit 106b (e.g., because target 124 has been fully determined by a corresponding clock cycle).

To illustrate, in some cases, second branch prediction circuit 104 may indicate that target 124 differs from target 122 more quickly, as compared to other cases. For example, in some embodiments, second branch prediction circuit 104 may output an indication that branch instruction 120 is an unconditional direct branch instruction. In cases where first branch prediction circuit 102 predicts that the branch is not taken, redirection circuit 106a may identify that the pipeline should be redirected more quickly, as compared to cases (e.g., a conditional branch instruction) where the target of the branch instruction identified by second branch prediction circuit 104 is used to identify that target 124 differs from target 122. As a result, in different cases, redirection circuits 106a-n may take a varying amount of time to output pipeline redirection information and pipeline redirection indications. This is illustrated in FIG. 1 by showing multiple redirection circuits 106a-n.

In response to pipeline redirection information 128a-n, training circuit 108 may send training information 130 to first branch prediction circuit 102, retraining first branch prediction circuit 102. For example, pipeline redirection information 128a may indicate branch instruction 120 and may further indicate that target 124 differed from target 122. Training circuit 108 may issue an array write to the branch prediction storage element of first branch prediction circuit 102, storing branch prediction information for branch instruction 120. In various embodiments, training information 130 may identify a tag of branch instruction 120. Further, in some embodiments, training information 130 may indicate whether a branch instruction occurs within a specified number of instructions (e.g., five or five hundred). In some cases (e.g., a loop), the identified branch instruction may be branch instruction 120. Additionally, in some embodiments, training information 130 may specify a number of instructions after target 124 to be fetched. For example, the number of instructions may be a number of instructions until another branch instruction or until an end of a corresponding program. As discussed above, in some embodiments, writing training information 130 may not be completed until a particular number (a first number) of cycles (e.g., two cycles or two thousand cycles) after a difference between targets 122 and 124 is detected.

In response to a pipeline redirection indication 126a-n, suppression circuit(s) 110 may determine whether to send pipeline redirection indication 132 (e.g., to an instruction fetch circuit of the pipeline) or delay redirection of the pipeline by suppressing the pipeline redirection indication. In particular, suppression circuit(s) 110 may determine whether branch instruction 120 corresponds to a potential multi-hit. For example, suppression circuit(s) 110 may identify the potential multi-hit based on identifying that branch instruction 120 is an unconditional direct branch instruction (e.g., if only unconditional direct branch instructions can be resolved quickly enough to cause potential multi-hits). As another example, suppression circuit(s) 110 may identify that branch instruction 120 is part of a loop having fewer than a particular number of instructions. In some embodiments, the particular number of instructions may be based on a fetch width (e.g., number of instructions fetched by an instruction fetch stage or specified by a corresponding entry within first branch prediction circuit 102). Alternatively, the particular number of instructions may be a specified number (e.g., a number specified as part of the design of branch prediction system 100). In some embodiments, the particular number of instructions may be greater than the particular number (first number) of clock cycles. If a potential multi-hit is detected, suppression circuit(s) 110 may prevent pipeline redirection indication 126a from being output as pipeline redirection indication 132. Instead, suppression circuit(s) may delay until a different pipeline redirection indication (e.g., pipeline redirection indication 126b) is received from a different pipeline stage and instead send that pipeline redirection indication as pipeline redirection indication 132. As a result, suppression circuit(s) 110 may control a timing of a redirection of the pipeline. As discussed above, by controlling the timing of the redirection of the pipeline, power consumption of branch prediction system 100 may be reduced, potential multi-hits may be prevented, or both.

In various embodiments, suppression circuit(s) 110 may determine that branch instruction 120 is part of the loop by determining that a tag of at least a portion of an address of branch instruction (e.g., a current program counter value) matches a tag of at least a portion of target 124. Accordingly, in some cases, if some or all of an address of target 124 is an alias of some or all of an address of branch instruction 120, a loop may be identified. Alternatively, suppression circuit(s) 110 may determine that branch instruction 120 is part of the loop by identifying that an address of a target of branch instruction 120 is within a particular number of instructions from an address that hashes, within first branch prediction circuit 102, to a same tag as an address of branch instruction 120. The particular number of instructions may correspond to a fetch width of an instruction fetch circuit.

In various embodiments, redirection circuits 106a-n may not be present in every stage of the pipeline. Similarly, suppression circuit(s) 110 may not be configured to operate in every stage of the pipeline. Additionally, training circuit 108 may not be configured to operate in every stage of the pipeline.

Figure 2:
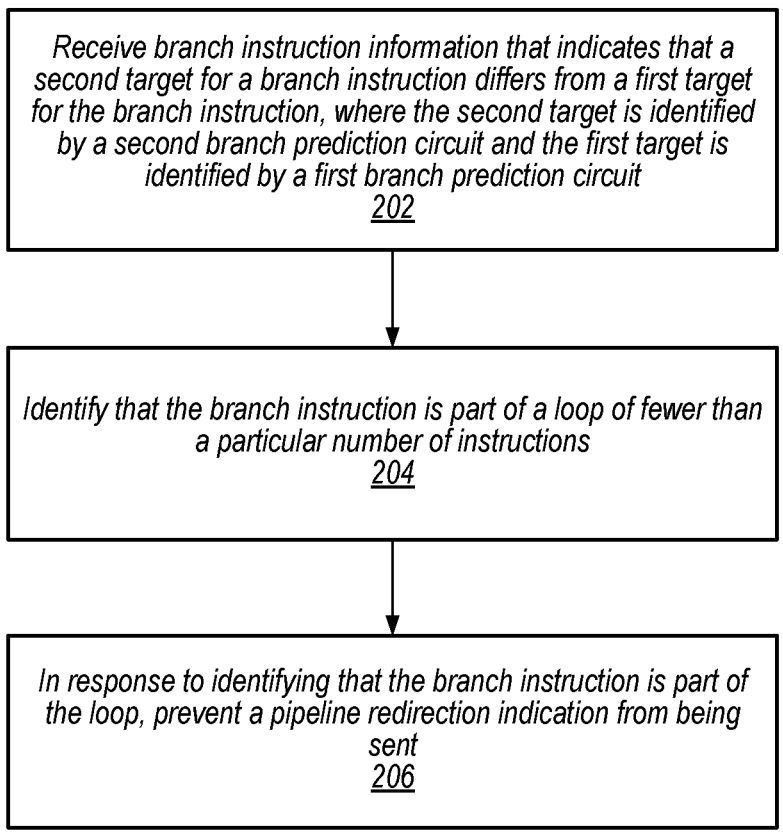
FIG. 2 is a flow diagram illustrating one embodiment of a method of operating a branch prediction system.

Referring now to FIG. 2, a flow diagram of a method 200 of operating a branch prediction system is depicted. In some embodiments, method 200 may be initiated or performed by one or more processors in response to one or more instructions stored by a computer-readable storage medium.

At 202, method 200 includes receiving branch instruction information that indicates that a second target for a branch instruction differs from a first target for the branch instruction. The second instruction is identified by a second branch prediction circuit and the first target is identified by a first branch prediction circuit. For example, suppression circuit(s) 110 of FIG. 1 may receive target 122 from first branch prediction circuit 102 (e.g., directly or indirectly) and may receive target 124 from second branch prediction circuit 104.

At 204, method 200 includes identifying that the branch instruction is part of a loop of fewer than a particular number of instructions. For example, suppression circuit(s) 110 may identify that branch instruction 120 is part of a loop that is fewer than a particular number of instructions corresponding to an amount of time it takes to retrain first branch prediction circuit 102.

At 206, method 200 includes in response to identifying that the branch instruction is part of the loop, preventing a pipeline redirection indication from being sent. For example, in response to identifying that branch instruction 120 is part of the loop, suppression circuit(s) 110 preventing pipeline redirection indication 126a from being sent as pipeline redirection indication 132. Accordingly, a method of operating a branch prediction system is depicted.

In various embodiments, method 200 may further include, in response to receiving second branch instruction information that does not indicate a potential multi-hit (e.g., because target 122 matches target 124 or because the instruction is not identified as being part of a loop of fewer than the particular number of instructions, or because the instruction is not an unconditional direct branch instruction), a pipeline redirection indication for the second branch instruction may be sent.

Figure 3:
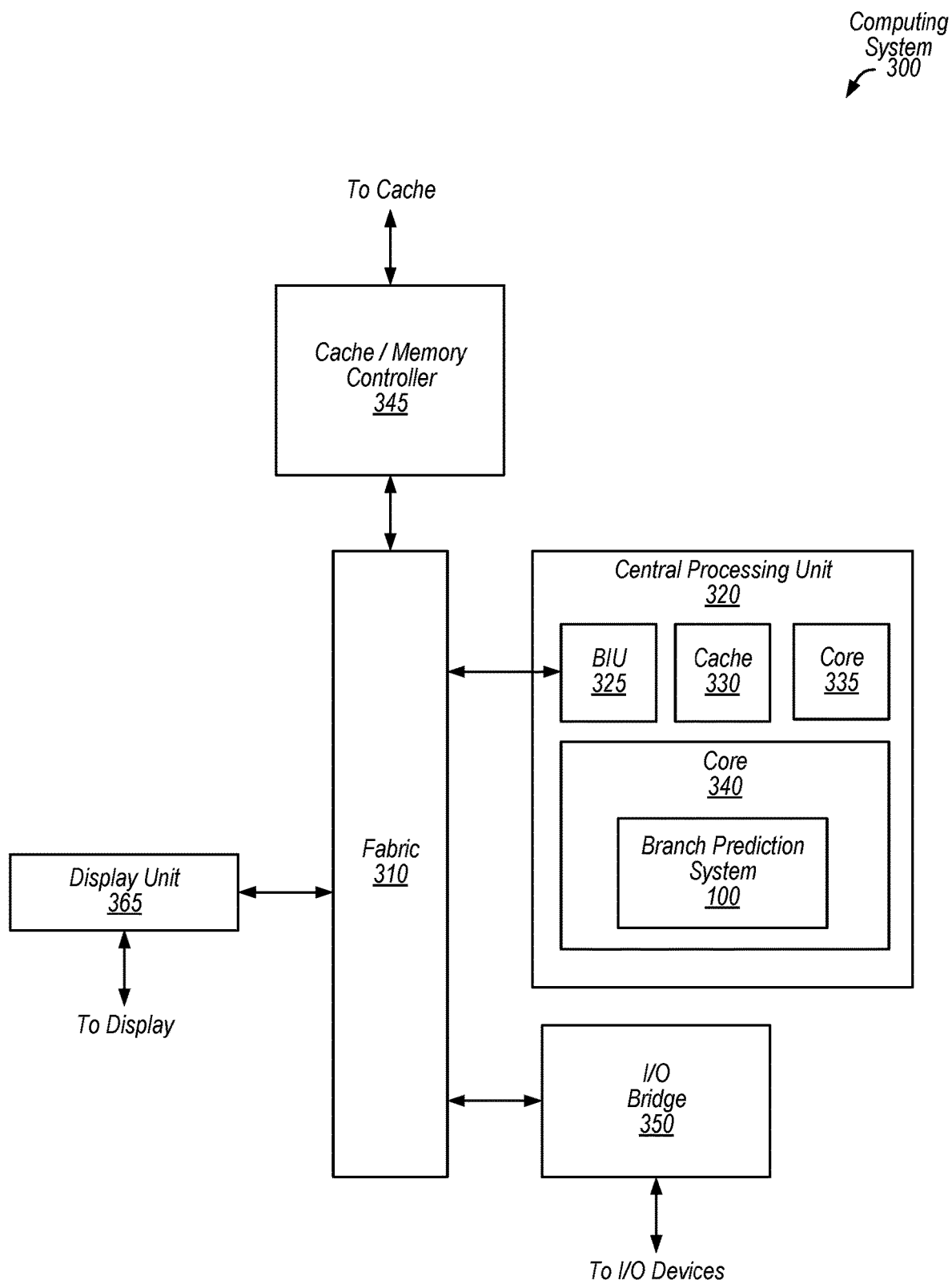
FIG. 3 is block diagram illustrating an embodiment of a computing system that includes at least a portion of a branch prediction system.

Turning next to FIG. 3, a block diagram illustrating an exemplary embodiment of a computing system 300 that includes at least a portion of a branch prediction redirection system. The computing system 300 includes branch prediction system 100 of FIG. 1. In some embodiments, branch prediction system 100 includes one or more of the circuits described above with reference to FIGS. 1 and 2, including any variations or modifications described previously. In some embodiments, some or all elements of the computing system 300 may be included within a system on a chip (SoC). In some embodiments, computing system 300 is included in a mobile device. Accordingly, in at least some embodiments, area and power consumption of the computing system 300 may be important design considerations. In the illustrated embodiment, the computing system 300 includes fabric 310, central processing unit (CPU) 320, input/output (I/O) bridge 350, cache/memory controller 345, and display unit 365. Although the computing system 300 illustrates branch prediction system 100 as being part of core 340, in other embodiments, branch prediction system 100 may be connected to or included in other components of the computing system 300 (e.g., within core 335 or within another device of computing system 300). Additionally, the computing system 300 may include multiple branch prediction systems 100. The multiple branch prediction systems 100 may correspond to different embodiments or to the same embodiment.

Fabric 310 may include various interconnects, buses, MUXes, controllers, etc., and may be configured to facilitate communication between various elements of computing system 300. In some embodiments, portions of fabric 310 are configured to implement various different communication protocols. In other embodiments, fabric 310 implements a single communication protocol and elements coupled to fabric 310 may convert from the single communication protocol to other communication protocols internally.

In the illustrated embodiment, CPU 320 includes bus interface unit (BIU) 325, cache 330, and cores 335 and 340.

In the illustrated embodiment, core 340 includes branch prediction system 100. In various embodiments, CPU 320 includes various numbers of cores and/or caches. For example, CPU 320 may include 1, 2, or 4 processor cores, or any other suitable number. One or more of the cores and/or caches may include branch prediction system 100. In some embodiments, cores 335 and/or 340 include internal instruction and/or data caches. In some embodiments, a coherency unit (not shown) in fabric 310, cache 330, or elsewhere in computing system 300 is configured to maintain coherency between various caches of computing system 300. BIU 325 may be configured to manage communication between CPU 320 and other elements of computing system 300. Processor cores such as cores 335 and 340 may be configured to execute instructions of a particular instruction set architecture (ISA), which may include operating system instructions and user application instructions.

Cache/memory controller 345 may be configured to manage transfer of data between fabric 310 and one or more caches and/or memories (e.g., non-transitory computer readable mediums). For example, cache/memory controller 345 may be coupled to an L3 cache, which may, in turn, be coupled to a system memory. In other embodiments, cache/memory controller 345 is directly coupled to a memory. In some embodiments, the cache/memory controller 345 includes one or more internal caches. In some embodiments, the cache/memory controller 345 may include or be coupled to one or more caches and/or memories that include instructions that, when executed by one or more processors (e.g., CPU 320), cause the processor, processors, or cores to initiate or perform some or all of the processes described above with reference to FIGS. 1 and 2 or below with reference to FIG. 4.

As used herein, the term "coupled to" may indicate one or more connections between elements, and a coupling may include intervening elements. For example, in FIG. 3, display unit 365 may be described as "coupled to" CPU 320 through fabric 310. In contrast, in the illustrated embodiment of FIG. 3, display unit 365 is "directly coupled" to fabric 310 because there are no intervening elements.

Display unit 365 may be configured to read data from a frame buffer and provide a stream of pixel values for display. Display unit 365 may be configured as a display pipeline in some embodiments. Additionally, display unit 365 may be configured to blend multiple frames to produce an output frame. Further, display unit 365 may include one or more interfaces (e.g., MIPI® or embedded display port (eDP)) for coupling to a user display (e.g., a touchscreen or an external display).

I/O bridge 350 may include various elements configured to implement: universal serial bus (USB) communications, security, audio, and/or low-power always-on functionality, for example. I/O bridge 350 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 300 via I/O bridge 350. In some embodiments, branch prediction system 100 may be part of a processor coupled to computing system 300 via I/O bridge 350.

Figure 4:
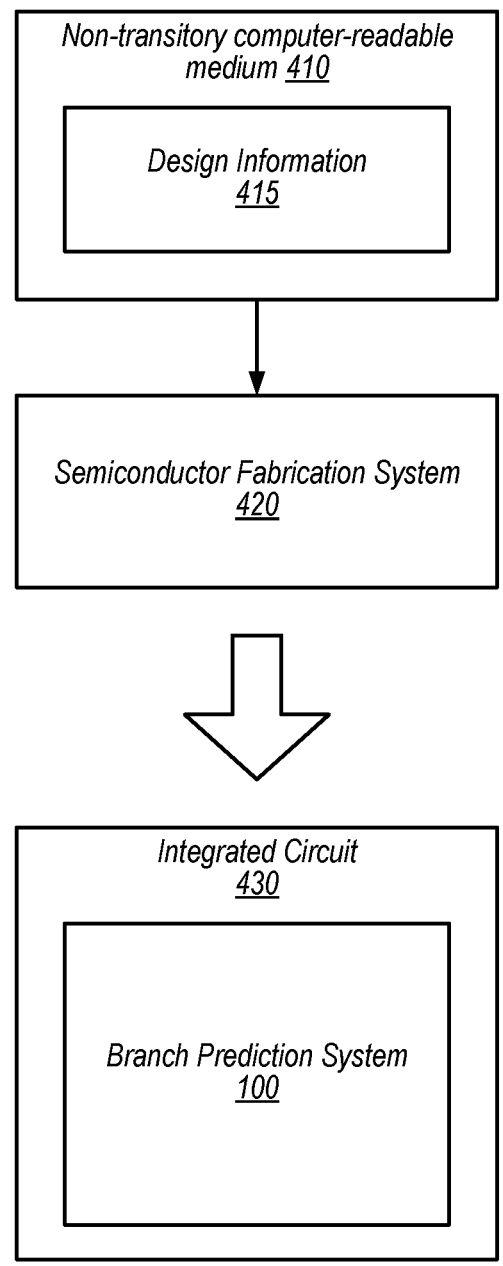
FIG. 4 is a block diagram illustrating one embodiment of a process of fabricating at least a portion of a processing circuit that includes a branch prediction system.

FIG. 4 is a block diagram illustrating a process of fabricating at least a portion of a branch prediction redirection system. FIG. 4 includes a non-transitory computer-readable medium 410 and a semiconductor fabrication system 420. Non-transitory computer-readable medium 410 includes design information 415. FIG. 4 also illustrates a resulting fabricated integrated circuit 430. In the illustrated embodiment, integrated circuit 430 includes branch prediction system 100 of FIG. 1. However, in other embodiments, integrated circuit 430 may only include one or more portions of branch prediction system 100 (e.g., suppression circuit(s) 110). In the illustrated embodiment, semiconductor fabrication system 420 is configured to process design information 415 stored on non-transitory computer-readable medium 410 and fabricate integrated circuit 430.

Non-transitory computer-readable medium 410 may include any of various appropriate types of memory devices or storage devices. For example, non-transitory computer-readable medium 410 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 410 may include two or more memory mediums, which may reside in different locations (e.g., in different computer systems that are connected over a network).

Design information 415 may be specified using any of various appropriate computer languages, including hardware description languages such as, without limitation: VHDL, Verilog, SystemC, SystemVerilog, RHDL, M, MyHDL, etc. Design information 415 may be usable by semiconductor fabrication system 420 to fabricate at least a portion of integrated circuit 430. The format of design information 415 may be recognized by at least one semiconductor fabrication system 420. In some embodiments, design information 415 may also include one or more cell libraries, which specify the synthesis and/or layout of integrated circuit 430. In some embodiments, the design information is specified in whole or in part in the form of a netlist that specifies cell library elements and their connectivity. Design information 415, taken alone, may or may not include sufficient information for fabrication of a corresponding integrated circuit (e.g., integrated circuit 430). For example, design information 415 may specify circuit elements to be fabricated but not their physical layout. In this case, design information 415 may be combined with layout information to fabricate the specified integrated circuit.

Semiconductor fabrication system 420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 420 may also be configured to perform various testing of fabricated circuits for correct operation.

In various embodiments, integrated circuit 430 is configured to operate according to a circuit design specified by design information 415, which may include performing any of the functionality described herein. For example, integrated circuit 430 may include any of various elements described with reference to FIGS. 1-3. Further, integrated circuit 430 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 430 is performed. Design information 415 may be generated using one or more computer systems and stored in non-transitory computer-readable medium 410. The method may conclude when design information 415 is sent to semiconductor fabrication system 420 or prior to design information 415 being sent to semiconductor fabrication system 420. Accordingly, in some embodiments, the method may not include actions performed by semiconductor fabrication system 420. Design information 415 may be sent to fabrication system 420 in a variety of ways. For example, design information 415 may be transmitted (e.g., via a transmission medium such as the Internet) from non-transitory computer-readable medium 410 to semiconductor fabrication system 420 (e.g., directly or indirectly). As another example, non-transitory computer-readable medium 410 may be sent to semiconductor fabrication system 420. In response to the method of initiating fabrication, semiconductor fabrication system 420 may fabricate integrated circuit 430 as discussed above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a first-level branch prediction circuit configured to predict a first target of a branch instruction;
a second-level branch prediction circuit configured to predict a second target of the branch instruction;
a redirection circuit configured to send a pipeline redirection indication in response to the first target differing from the second target; and
a suppression circuit configured to prevent the pipeline redirection indication from being sent in response to identifying, for the branch instruction, a potential multi-hit condition in which multiple entries of the first-level branch prediction circuit include information for the branch instruction, wherein the potential multi-hit condition is identified based on the branch instruction being a part of a loop having fewer than a particular number of instructions.

2. The system of claim 1, further comprising a training circuit configured to provide training information to the first-level branch prediction circuit in response to the first target differing from the second target, wherein the training information identifies a tag of the branch instruction.

3. The system of claim 2, wherein the first-level branch prediction circuit is configured to update prediction information corresponding to the branch instruction in response to the training information, wherein updating the prediction information takes more than a first number of clock cycles, and wherein the first number is larger than the particular number.

4. The system of claim 2, wherein the training information includes an indication of whether a second branch instruction occurs within a specified number of instructions of the second target.

5. The system of claim 4, wherein the second branch instruction is the branch instruction.

6. The system of claim 2, wherein the training information specifies a second particular number of instructions after the second target to be fetched, wherein the branch instruction is within the second particular number of instructions from the second target.

7. The system of claim 1, wherein the suppression circuit is configured to identify that the branch instruction is part of the loop by determining that a tag of at least a portion of an address of the branch instruction matches a tag of at least a portion of an address of the second target.

8. The system of claim 7, wherein the tag of the second target is an alias of the tag of the branch instruction.

9. The system of claim 1, further comprising a second redirection circuit configured to send a second pipeline redirection indication in response to the first target differing from the second target, wherein the redirection circuit is configured to send the pipeline redirection indication during a first clock cycle after the first-level branch prediction circuit predicts the first target, and wherein the second redirection circuit is configured to send the second pipeline redirection indication during a second clock cycle after the first-level branch prediction circuit predicts the first target.

10. The system of claim 9, wherein the first clock cycle and the second clock cycle correspond to different pipeline stages of a pipeline that includes the first-level branch prediction circuit and the second-level branch prediction circuit.

11. A non-transitory computer readable storage medium having stored thereon design information that specifies a circuit design in a format recognized by a fabrication system that is configured to use the design information to fabricate a hardware integrated circuit that includes:
a first branch prediction circuit configured to predict a first target of a branch instruction;
a second branch prediction circuit configured to predict a second target of the branch instruction;
a redirection circuit configured to send a pipeline redirection indication in response to the first target differing from the second target; and
a suppression circuit configured to delay redirection of a pipeline for at least one clock cycle by preventing the pipeline redirection indication from being sent in response to identifying that data corresponding to the branch instruction indicates a potential multi-hit in which multiple entries of the first branch prediction circuit include information for the branch instruction, wherein the suppression circuit is configured to identify that the data indicates the potential multi-hit based on the data indicating that the branch instruction is a part of a loop having fewer than a particular number of instructions.

12. The non-transitory computer readable storage medium of claim 11, wherein the first branch prediction circuit is a second-level branch prediction circuit, and wherein the second branch prediction circuit is a third-level branch prediction circuit.

13. A method, comprising:
   receiving, by a suppression circuit of a processor, branch instruction information that indicates that a first target for a branch instruction differs from a second target for the branch instruction, wherein the first target is identified by a first branch prediction circuit and the second target is identified by a second branch prediction circuit;
   identifying, by the suppression circuit, a potential multi-hit condition in which multiple entries of the first branch prediction circuit include information for the branch instruction, wherein the potential multi-hit condition is identified based on the branch instruction being a part of a loop having fewer than a particular number of instructions; and
   in response to identifying the potential multi-hit condition, preventing, by the suppression circuit, a pipeline redirection indication from being sent to an instruction fetch circuit of the processor.

14. The method of claim 13, further comprising:
   receiving second branch instruction information that indicates that a second target for a second branch instruction differs from a first target for the second branch instruction, wherein the second target for the second branch instruction is identified by the second branch prediction circuit and the first target for the second branch instruction is identified by the first branch prediction circuit;
   identifying that the second branch instruction is not part of a loop of fewer than the particular number of instructions; and
   in response to identifying that the branch instruction is not part of the loop, sending a pipeline redirection indication.

15. The method of claim 13, wherein the first target is determined based on a first amount of history information of the branch instruction, wherein the second target is determined based on a second amount of history information of the branch instruction, and wherein the second amount is larger than the first amount.

16. The method of claim 13, wherein identifying that the branch instruction is part of a loop comprises identifying that an address of a target of the branch instruction is within a particular number of instructions from an address that hashes, within the first branch prediction circuit, to a same tag as an address of the branch instruction.

* * * * *